United States Patent
Kobayashi

(10) Patent No.: US 9,651,795 B2
(45) Date of Patent: May 16, 2017

(54) IMAGE DISPLAY DEVICE

(71) Applicant: JVC KENWOOD Corporation, Yokohama-shi (JP)

(72) Inventor: Tatsuru Kobayashi, Yokohama (JP)

(73) Assignee: JVC KENWOOD Corporation, Yokohama-shi (JP)

( * ) Notice: Subject to any disclaimer, the term of this patent is extended or adjusted under 35 U.S.C. 154(b) by 184 days.

(21) Appl. No.: 14/597,723

(22) Filed: Jan. 15, 2015

(65) Prior Publication Data

US 2015/0124227 A1    May 7, 2015

Related U.S. Application Data

(63) Continuation of application No. PCT/JP2013/004296, filed on Jul. 11, 2013.

(30) Foreign Application Priority Data

Jul. 31, 2012  (JP) ................. 2012-170391

(51) Int. Cl.
*G02B 27/48* (2006.01)
*H04N 9/31* (2006.01)
(Continued)

(52) U.S. Cl.
CPC ............ *G02B 27/48* (2013.01); *G02B 5/02* (2013.01); *G02B 27/0101* (2013.01);
(Continued)

(58) Field of Classification Search
CPC .. G03B 21/208; G03B 21/2033; G02B 27/48; G02B 5/02
See application file for complete search history.

(56) References Cited

U.S. PATENT DOCUMENTS

2003/0039036 A1* 2/2003 Kruschwitz ........ G02B 27/0927
359/707
2009/0185141 A1* 7/2009 Chen ...................... G02B 27/48
353/38
(Continued)

FOREIGN PATENT DOCUMENTS

JP    2008-026853 A    2/2008

OTHER PUBLICATIONS

International Search Report issued in PCT International Application No. PCT/JP2013/004296 dated Aug. 13, 2013.
(Continued)

*Primary Examiner* — Sultan Chowdhury
(74) *Attorney, Agent, or Firm* — Venable LLP; Michael A. Sartori; Laura G. Remus

(57) ABSTRACT

An image display device includes: a light source that emits a beam having a spreading angle in a first direction and a spreading angle in a second direction, which is smaller than the spreading angle in the first direction, in a direction perpendicular to the first direction; an afocal optical system member that has a focal point and changes the beam emitted by the light source into a parallel beam; an anisotropic diffusion plate that is arranged at the focal point and that widens at least the spreading angle in the second direction; a vibration unit that vibrates the anisotropic diffusion plate; a fly-eye lens array on which the parallel beam emitted from the afocal optical system member becomes incident; an image display element that modulates the beam that has passed through the fly-eye lens array into image display light.

5 Claims, 15 Drawing Sheets

(51) Int. Cl.
*G02B 5/02* (2006.01)
*G02B 27/01* (2006.01)
*G03B 21/20* (2006.01)
*G03B 21/00* (2006.01)

(52) U.S. Cl.
CPC ......... *G03B 21/005* (2013.01); *G03B 21/208* (2013.01); *G03B 21/2033* (2013.01); *H04N 9/3161* (2013.01); *G02B 2027/0118* (2013.01)

(56) References Cited

U.S. PATENT DOCUMENTS

| | | | |
|---|---|---|---|
| 2011/0164294 A1* | 7/2011 | Shimizu | G02B 27/0172 359/13 |
| 2011/0227487 A1* | 9/2011 | Nichol | G02B 6/0018 315/158 |
| 2011/0234985 A1* | 9/2011 | Ryf | G03B 21/14 353/38 |
| 2012/0224389 A1* | 9/2012 | Kashiwagi | G02B 27/2214 362/608 |

OTHER PUBLICATIONS

International Preliminary Report on Patentability issued in PCT International Application No. PCT/JP2013/004296 dated Feb. 3, 2015.

* cited by examiner

FIG.8
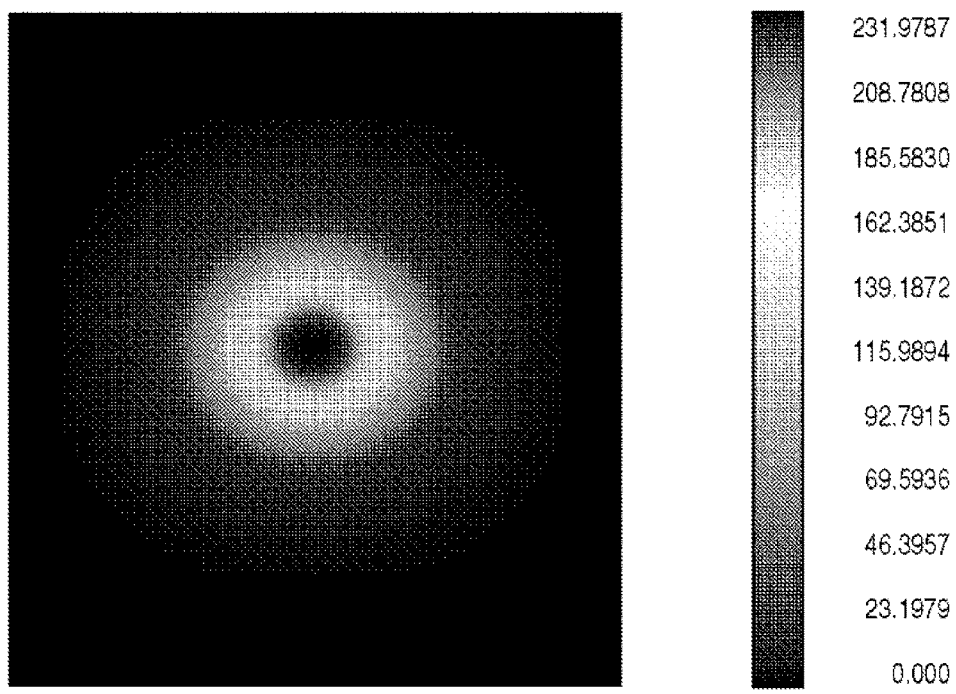
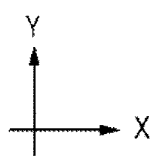

FIG.14
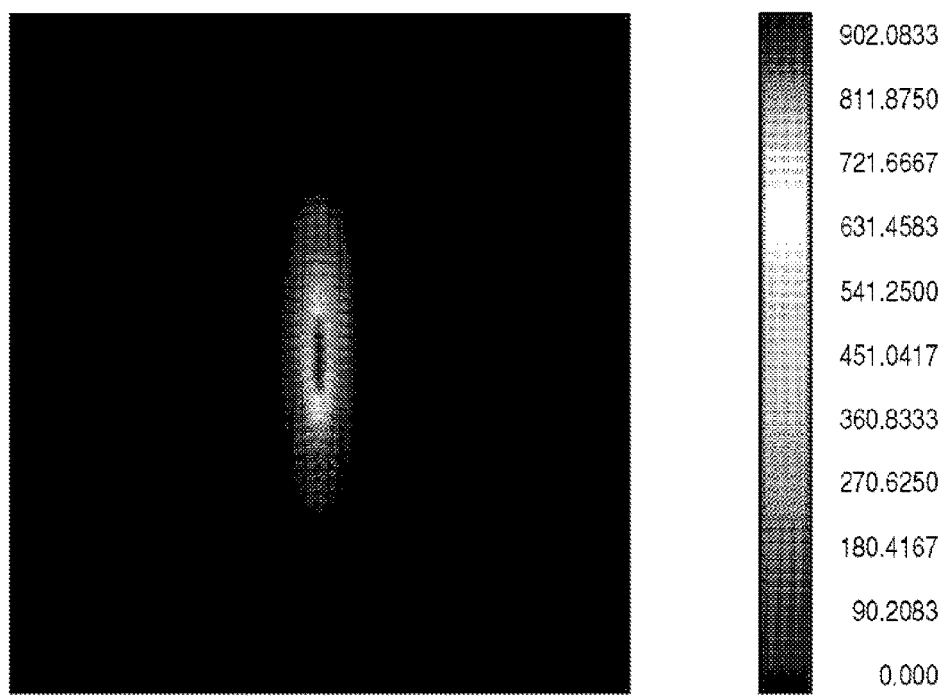
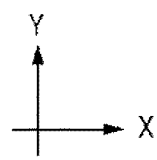

IMAGE DISPLAY DEVICE

CROSS REFERENCE TO RELATED APPLICATION

This application is based upon and claims the benefit of priority from the prior Japanese Patent Application No. 2012-170391, filed Jul. 31, 2012, the contents of which are incorporated herein by references.

BACKGROUND

1. Field of the Invention

The present invention relates to an image display device and, more specifically, to an image display device that is capable of increasing utilization efficiency of light emitted from a laser diode light source and reducing the effect of speckle noise.

2. Description of the Related Art

As an image display device that projects image display light from an optical unit such as a lens so as to present an image to a user, a so-called "projector" has been conventionally known widely. In recent years, new needs have started being established for this projector such as needs for easy portability by a user, usage while being connected to a portable terminal owned by the user, and the like. Therefore, there is an increasing demand for the miniaturization of the projector.

As an image display device that presents an image based on image display light, so-called "head up displays" have been developed conventionally. Head up displays have an optical element called combiner. This combiner allows external light to pass through and reflects image display light projected from an optical unit provided in a head up display. This allows the user to visually recognize an image related to the image display light while overlapping the image on a landscape via the combiner.

Head up displays have received attention as in-vehicle image display devices in recent years since the head up displays allow a driver of a vehicle to also recognize, almost without changing the line of sight or a focus for visually recognizing a view outside the vehicle, information of an image projected from an optical unit. There is also an increasing demand for the miniaturization of these head up displays due to the need for installation in a limited space such as a vehicle.

Thus, instead of discharge lamps such as ultrahigh pressure mercury lamps, xenon lamps, or halogen lamps used as light sources in conventional projectors, semiconductor light sources that allow for further miniaturization of the devices have been developed. In comparison with discharge lamps, semiconductor light sources have advantages such as low power consumption, instantaneous lighting capability, long life, high chromatic purity, or non-use of mercury, and the advantages are also factors that encourage the development. Among semiconductor light sources, light emitting diodes (LEDs) are spreading rapidly. For example, Patent document No. 1 describes an image display device that uses an LED as a light source.

[Patent document No. 1] Japanese Patent Application Publication No. 2008-026853

It is necessary to increase power to be supplied or increase the area of a light-emitting surface in order to obtain, using an LED as a light source, the same degree of brightness as the brightness obtained when a discharge lamp is used as a light source. Therefore, there has been a problem where it is difficult to obtain sufficient brightness when an LED is used as a light source in a small image display device.

Thus, a possible option is to use a laser diode (LD) as a light source. Different from an LED, a laser diode is not a surface light-emitting source and is almost close to a point light-emitting source. Therefore, compared to an LED, a laser diode allows for the miniaturization of a device while increasing the amount of beam rays per unit area (luminous flux).

However, in general, a beam emitted from a laser diode has deviation (astigmatic difference) in the spread thereof. FIG. 14 shows distribution of the intensity of light emitted from a laser diode. As shown in FIG. 14, the distribution of the light emitted from the laser diode spreads wider in one direction (a Y direction in FIG. 14) than in another direction that is perpendicular to the direction. In other words, there is deviation (astigmatic difference) in the spreading of the beam. FIG. 15 schematically shows light emitted from a laser diode. As shown in FIG. 15, the light emitted from the laser diode does not spread in a circular shape but spreads in a substantially elliptic shape where the light spreads wider in the Y direction compared to the X direction.

When light is emitted spreading in a substantially elliptic shape as described above, there is a problem where the utilization efficiency of the light as image display light becomes lower than light that spreads in a substantially circular shape. A decrease in the utilization efficiency of the light may cause an increase in the size of a device and a decrease in the brightness of a projected image.

Further, the use of a laser diode as a light source causes a problem where speckle noise is generated by interference light due to high coherence of laser light. The quality level of a projected image may be lowered due to the generation of speckle noise.

SUMMARY

In this background, a purpose of the present invention is to provide an image display device that is capable of increasing utilization efficiency of light emitted from a laser diode light source and reducing the effect of speckle noise.

An image display device according to the present invention is an image display device including: a light source that emits a beam having a spreading angle in a first direction and a spreading angle in a second direction, which is smaller than the spreading angle in the first direction, in a direction perpendicular to the first direction; an afocal optical system member that has a focal point and changes the beam emitted by the light source into a parallel beam; an anisotropic diffusion plate that is arranged at a position corresponding to the focal point and that widens at least the spreading angle in the second direction; a vibration unit that vibrates the anisotropic diffusion plate in a predetermined direction; a fly-eye lens array on which the parallel beam emitted from the afocal optical system member becomes incident; an image display element that modulates the beam that has passed through the fly-eye lens array into image display light; and a projection lens that projects the image display light.

BRIEF DESCRIPTION OF THE DRAWINGS

Embodiments will now be described, by way of example only, with reference to the accompanying drawings that are meant to be exemplary, not limiting, and wherein like elements are numbered alike in several figures, in which:

FIG. 8 is a diagram showing intensity distribution at the front of an optical axis after passing through the anisotropic diffusion plate in the afocal optical system;

FIG. 14 shows intensity distribution of emitted light from a laser diode at the front of an optical axis.

DETAILED DESCRIPTION

Figure 1:
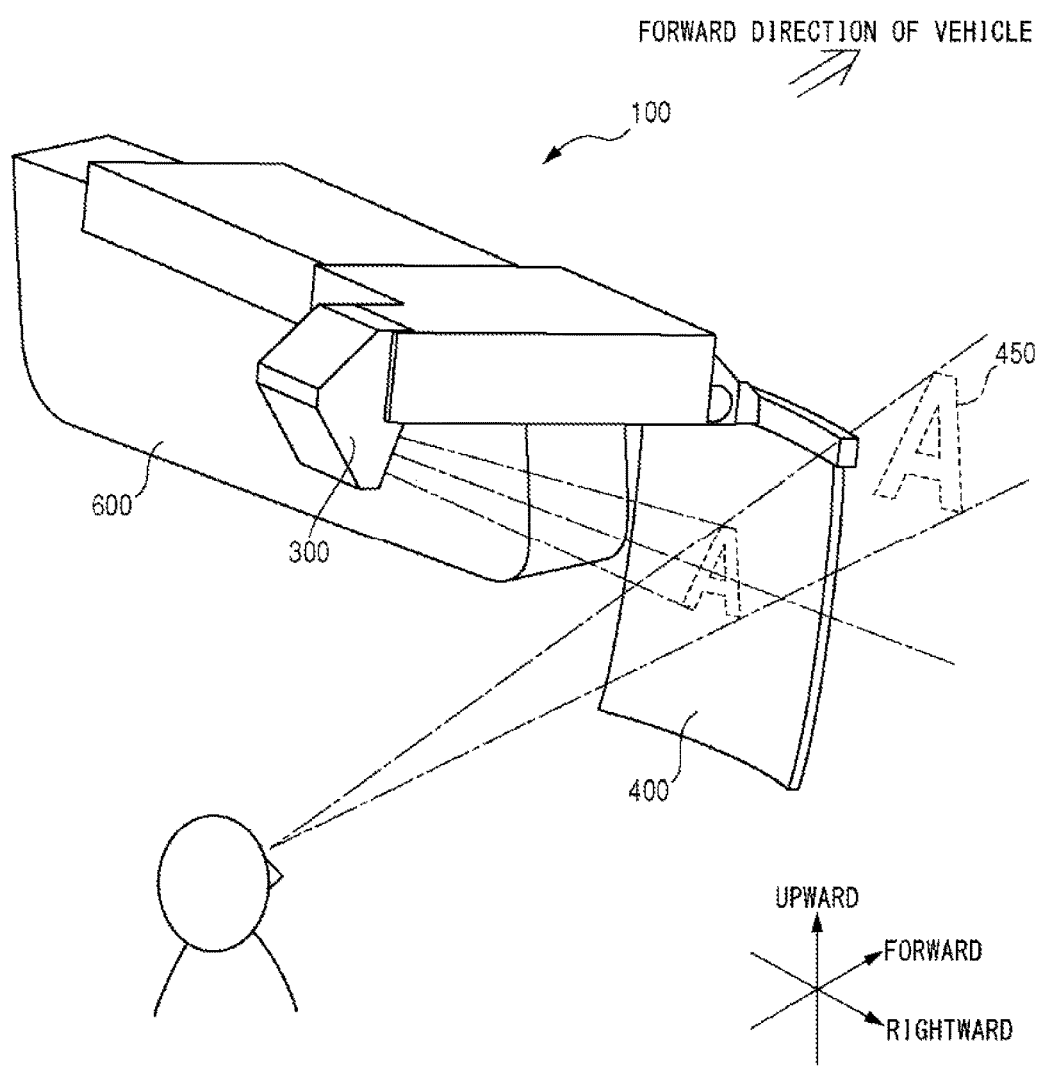
FIG. 1 is a diagram showing a head up display, which is an image display device according to a first embodiment.

The invention will now be described by reference to the preferred embodiments. This does not intend to limit the scope of the present invention, but to exemplify the invention.

Described below is an explanation of the embodiments of the present invention with reference to figures. Specific numerical values and the like shown in the embodiments are shown merely for illustrative purposes to facilitate understanding of the invention and do not intend to limit the scope of the present invention, unless otherwise noted. In the subject specification and figures, elements having substantially the same functions and structures shall be denoted by the same reference numerals, and duplicative explanations will be omitted appropriately. Also, the illustration of elements that are not directly related to the present invention is omitted.

First Embodiment

FIG. 1 shows an example of a head up display 100, which is an image display device according to a first embodiment.

The head up display 100 is used while being attached to a rear-view mirror 600 of a vehicle. A combiner 400 of the head up display 100 reflects image display light projected from a projection unit 300 so as to allow a user to recognize the image display light as a virtual image and transmits a view outside the vehicle so as to allow the user to visually recognize the view. In FIG. 1, the projection unit 300 is projecting image display light related to an image of a letter "A" on the combiner 400. Looking at the combiner 400, the user recognizes the letter "A" in such a manner as if the letter were displayed, for example, 1.7 m to 2.0 m ahead (in a forward direction of the vehicle). In other words, the user can recognize a virtual image 450 of "A". In the following, a central axis of the image display light projected on the combiner 400 from the projection unit 300 is referred to as a projection axis.

Figure 2:
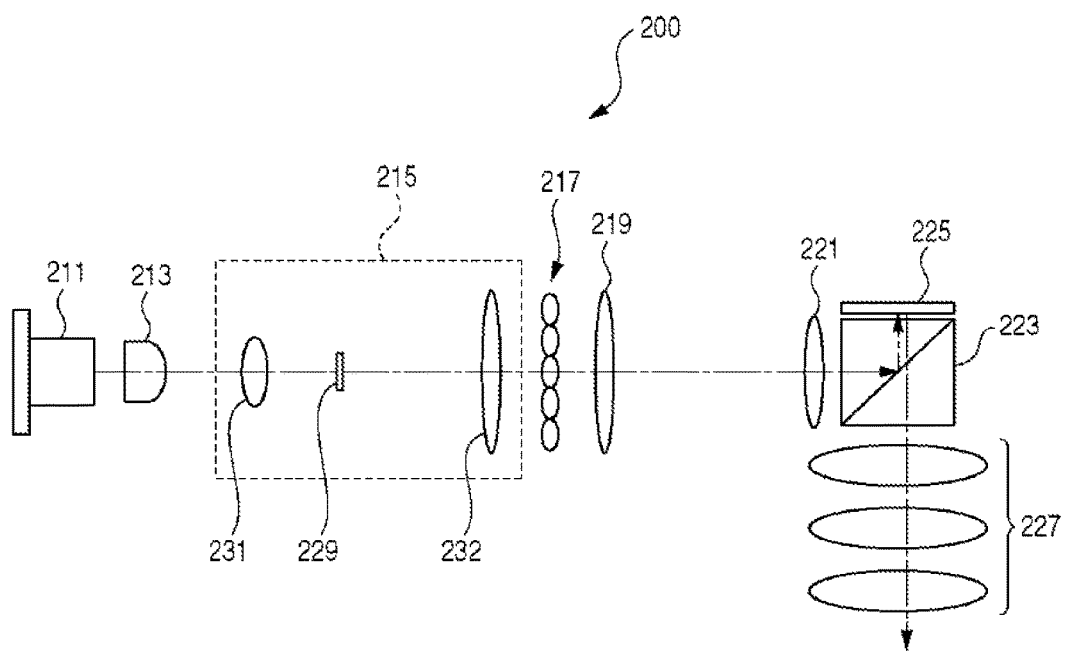
FIG. 2 is a diagram schematically showing an optical system inside the head up display.

FIG. 2 is a diagram showing the overview of an optical system 200 inside the head up display 100. As shown in FIG. 2, the optical system 200 has a laser diode 211, a collimate lens 213, an afocal optical system 215, a fly-eye lens array 217, a condenser lens 219, a field lens 221, a polarization beam splitter 223, an image display element 225, and a projection lens group 227.

The laser diode 211 emits white light. On the side of a surface of the laser diode 211 that is opposite to a light emitting surface thereof, a heat sink (not shown) is attached for dissipation of heat. Light emitted by the laser diode 211 is changed to parallel light by the collimate lens 213. The parallel light is changed to parallel light that is wider around an optical axis by the afocal optical system 215 and becomes incident on the fly-eye lens array 217. The fly-eye lens array 217 divides the incident parallel light into a predetermined number of beams by a rectangular lens array having aspect ratio that allows the rectangular lens array to have a similarity relationship with the image display element 225. Divided light is collected by a condenser lens 219 and the field lens 221 and reflected by the polarization beam splitter (PBS) 223.

After the direction of the optical axis is bent by 90 degrees by the polarization beam splitter 223, the divided light illuminates the image display element 225, which is a reflective liquid crystal panel called a liquid crystal on silicon (LCOS) of, for example, a size of 0.35 inches diagonally and a resolution of 800*600. Image display light that is reflected inside the image display element 225 and then emitted is transmitted through the polarization beam splitter 223 and becomes incident on the projection lens group 227. The image display light transmitted through the projection lens group 227 passes through an optical path directed to the combiner 400 via a plurality of projection mirrors (not shown).

While heading to the combiner 400 after passing through the projection lens group 227, the image display light forms an image on an intermediate image screen (not shown). The image display light related to the real image formed on the intermediate image screen is transmitted through the intermediate image screen and projected on the combiner 400. In the way described above, light that is emitted from the laser diode 211 becomes image display light, and the user recognizes a virtual image related to this projected image display light in the forward direction via the combiner 400, as described above.

Figure 3:
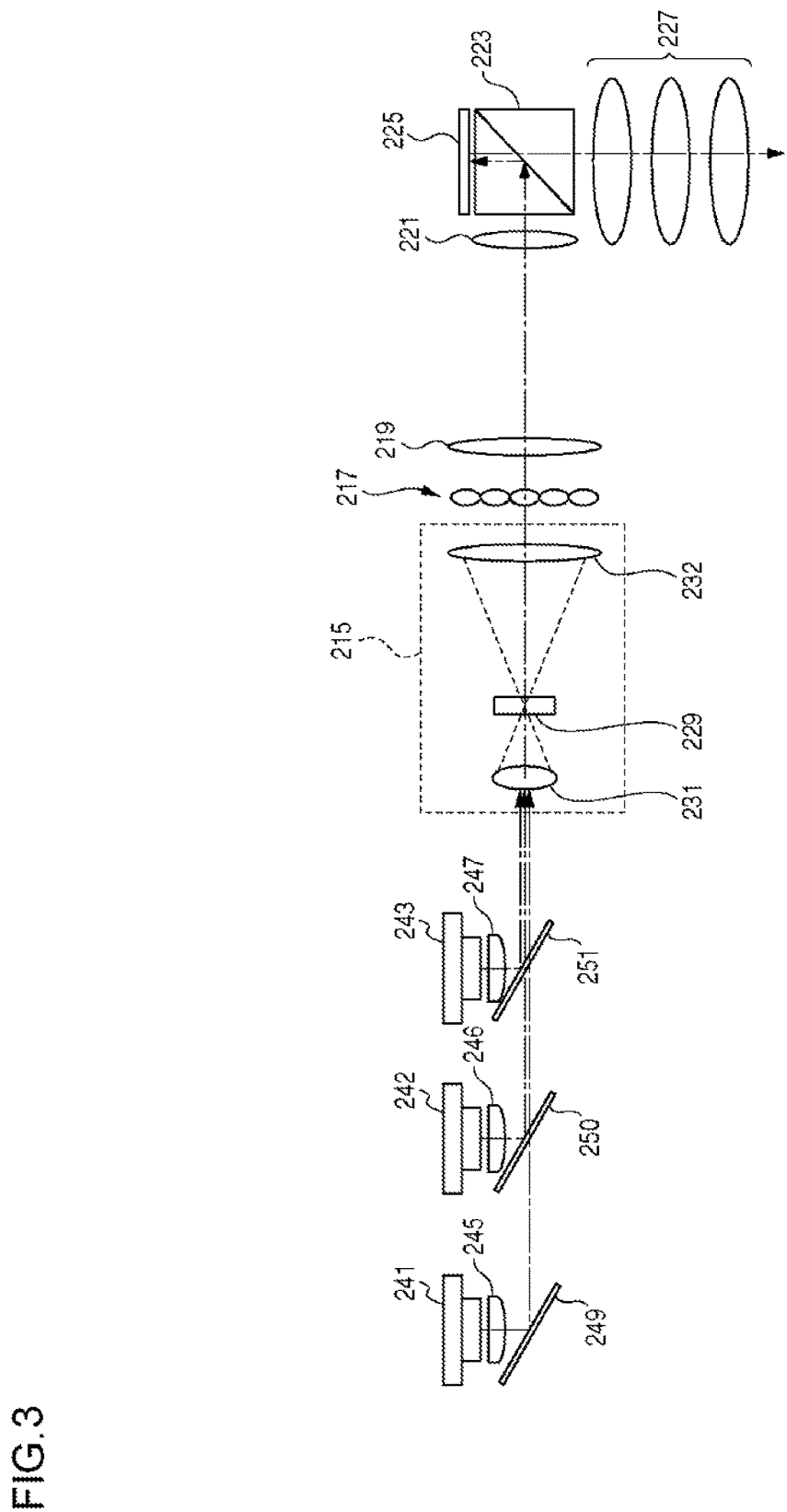
FIG. 3 is a diagram schematically showing an optical system in which laser diodes of three colors are combined.

As shown in FIG. 3, the laser diode that is used as a light source may be a combination of laser diodes of three colors: a blue laser diode 241; a green laser diode 242; and a red laser diode 243. In this case, the laser diodes are provided with collimate lenses 245, 246, and 247, respectively, and dichroic mirrors 249, 250, and 251, respectively. Each of the dichroic mirrors 249, 250, and 251 reflects a corresponding wavelength of laser light and transmits other wavelengths. Light that is emitted from the respective laser diodes is combined by these collimate lenses and dichroic mirrors and becomes incident on the afocal optical system 215. This structure is non-limiting. In the case where display is achieved by one or a plurality of specific colors, a combination of one or a plurality of laser diodes that can produce those colors can be employed.

Figure 4:
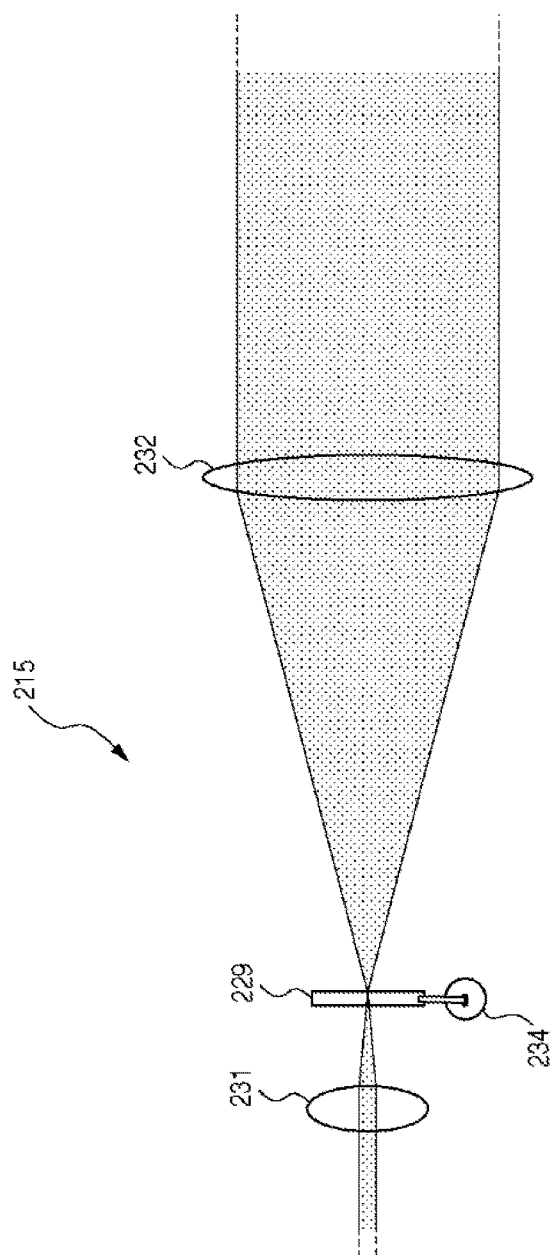
FIG. 4 is a diagram showing an afocal optical system in further detail.

As shown in FIG. 4, the afocal optical system 215 is constituted of two convex lenses 231 and 232 having positive power such that an incident beam has a diameter of a desired size. The afocal optical system 215 according to the present embodiment is constituted of a plano-convex lens. However, the afocal optical system 215 may be constituted of a lens having a concave surface as long as the lens has positive power or may be constituted of an achromatic lens where lenses of different refractive index materials are bound together for the purpose of reducing chromatic aberration.

The afocal optical system 215 has a focal point between the convex lenses 231 and 232, and an anisotropic diffusion plate 229 is arranged at a position that corresponds to this focal point. This anisotropic diffusion plate 229 is driven by a vibration motor 234 as described later and vibrates in a predetermined direction.

Figure 5:
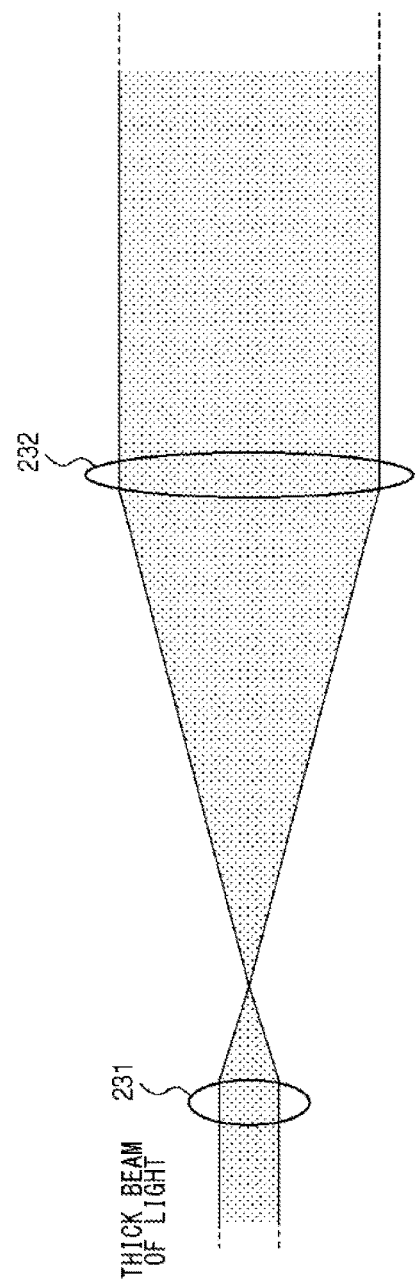
FIG. 5 is a diagram showing a state where a thick beam is enlarged in the afocal optical system.
Figure 6:
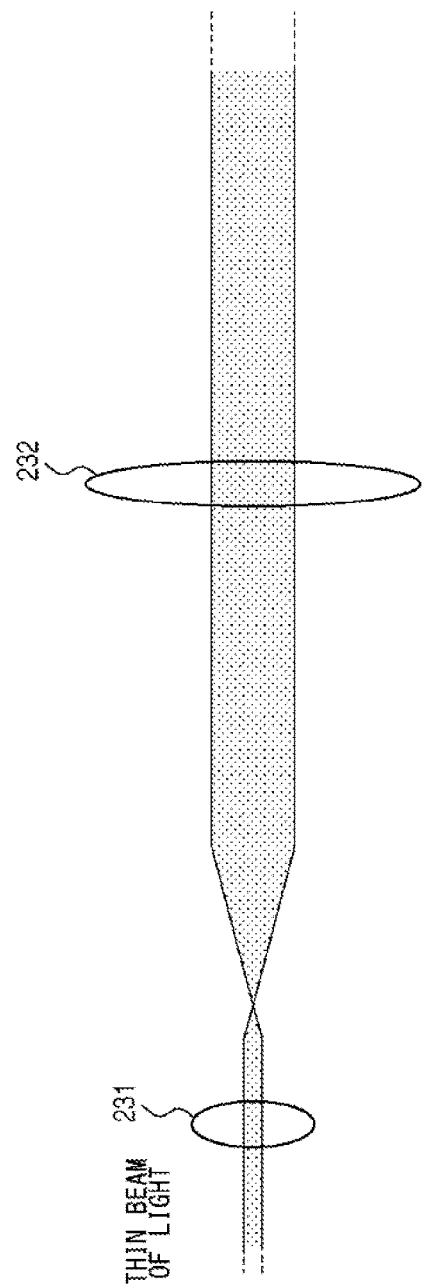
FIG. 6 is a diagram showing a state where a thin beam is enlarged in the afocal optical system.

In the afocal optical system 215, a thick beam (a beam in a Y-axis direction shown in FIG. 14) and a thin beam (a beam in an X-axis direction shown in FIG. 14) are both magnified at the same magnification ratio as shown in FIG. 5 and FIG. 6. Thus, light having an elliptical cross section caused by an astigmatic difference of the laser diode 211 is directly magnified to become light having an elliptical cross section when this anisotropic diffusion plate 229 does not exist.

Figure 7:
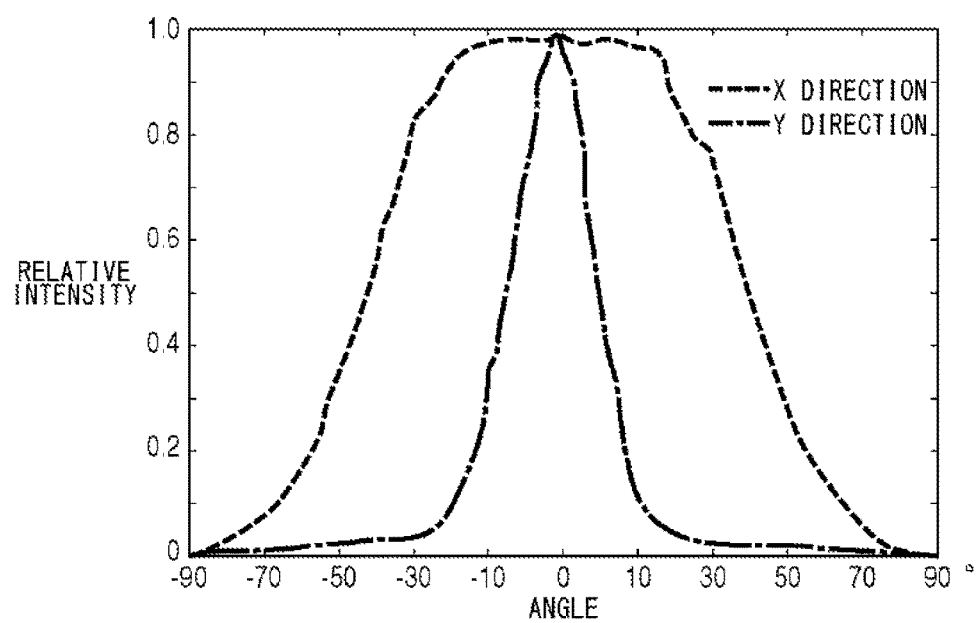
FIG. 7 is a diagram showing intensity distribution with respect to a spreading angle of emitted light when a parallel beam having equal widths in X and Y directions is incident on an anisotropic diffusion plate.

FIG. 7 is a diagram showing, in an X direction and a Y direction that are perpendicular to each other on a plane of the anisotropic diffusion plate 229, intensity distribution with respect to a spreading angle of emitted light when a parallel beam having equal widths in the X and Y directions is incident on the anisotropic diffusion plate 229. As shown in this figure, the anisotropic diffusion plate 229 has the X direction in which diffusion occurs at a large angle and the Y direction in which diffusion or convergence occurs at a small angle even when a beam having the same widths is incident thereon.

The anisotropic diffusion plate 229 is arranged such that, regarding an incident beam having an elliptic shape, the short-axis direction thereof is in a direction in which diffusion occurs at a larger angle and the large-axis direction thereof is in a direction in which direct transmission occurs or diffusion or convergence occurs at a smaller angle. In this way, the anisotropic diffusion plate 229 allows the beam with an elliptical cross section to be emitted in a form of a parallel beam with a cross section having a shape close to a substantially circular shape so that the parallel beam becomes incident on the fly-eye lens array 217. Therefore, the anisotropic diffusion plate 229 allows for an increased in the utilization efficiency of light emitted from the laser diode 211.

FIG. 8 is a diagram showing a measurement result of intensity distribution of a beam around an optical axis after being transmitted through the anisotropic diffusion plate 229. As shown in this figure, in comparison with a shape, which is thin and long in an Y direction, shown in FIG. 14 obtained immediately after the emission from the laser diode 211, the cross-sectional shape of a beam is found to be deformed into a cross-sectional shape that allows for the irradiation of the entire fly-eye lens array 217 while being spread in an X direction after passing through the anisotropic diffusion plate 229.

Figure 9:
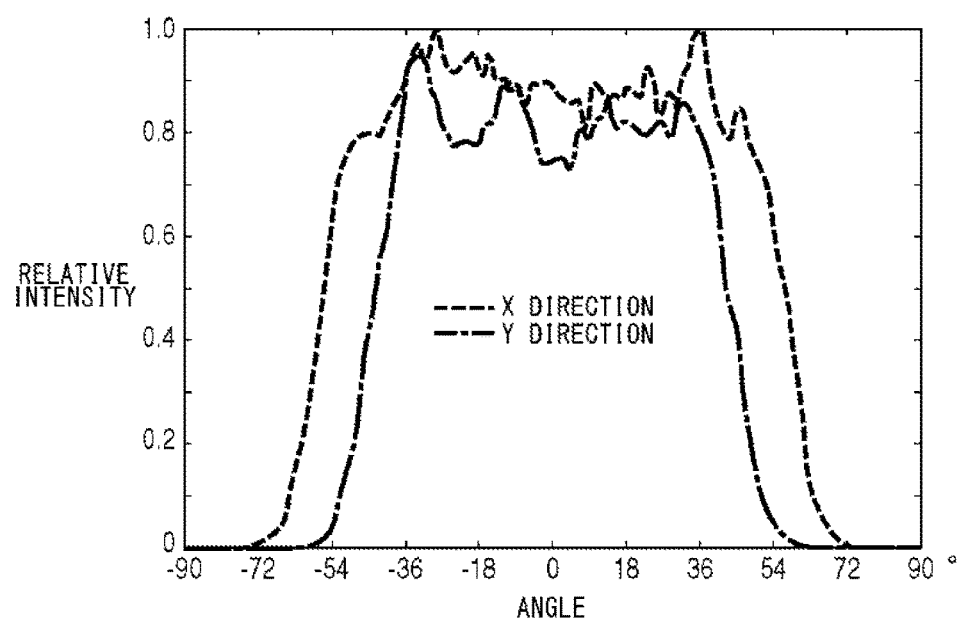
FIG. 9 is a diagram showing intensity distribution with respect to a spreading angle of emitted light in the X and Y directions after passing through the anisotropic diffusion plate in the afocal optical system.

FIG. 9 is a diagram showing intensity distribution with respect to a spreading angle of emitted light in X and Y directions after being transmitted through the anisotropic diffusion plate 229. As shown in this figure, the beam that is thin and long in the Y direction immediately after the emission from the laser diode 211 is found to be largely diffused in the X direction. As described, by using the anisotropic diffusion plate 229, a beam emitted from the laser diode 211 can be expanded while keeping relative intensity. This allows a beam that is incident on the fly-eye lens array 217 or the image display element 225 to have higher brightness uniformity. Therefore, also in image signal light projected on the combiner 400, a screen can be achieved whose brightness is uniform throughout the entire screen.

For the anisotropic diffusion plate 229, an anisotropic diffusion plate can be used that is formed using an anisotropic diffusion material such as a hologram diffusion plate, a liquid crystal dispersion sheet, a minute cylindrical lens, and so forth. In particular, a hologram diffusion plate, which allows polarization to be maintained even when transmission occurs, is preferred.

In the present embodiment, a spreading angle is different in X and Y directions that are perpendicular to each other. However, a direction in which diffusion occurs the most and a direction in which diffusion occurs the least do not always need to be perpendicular to each other, and a direction for diffusion can be appropriately selected in consideration of the cross-sectional shape of a beam of incident light and a desired cross-sectional shape of an irradiation target.

The fly-eye lens array 217, which divides illuminating light, is constituted of an array of ultra-fine lenses called a cell and is, for example, a collection of about 1200 minute rectangular cells of 100 μm*200 μm. If the fly-eye lens array 217 is illuminated directly by a beam without using the anisotropic diffusion plate 229 described above, only the half thereof, which is about 600 cells, is illuminated by a beam. On the other hand, when the anisotropic diffusion plate 229 is used, almost the entire 1200 cells can be illuminated. Therefore, when the anisotropic diffusion plate 229 is used, the number of illuminating beams that are divided can be increased. The light angle of collimated light that is incident on the fly-eye lens array 217 becomes larger with an increase in the diameter. With the division of the beam by segmentalization, the distribution of the light angles thereof becomes segmentalized and dispersed. Therefore, speckle noise caused by collimated light emitted from the laser diode 211 is reduced. Further, light having higher brightness uniformity can be achieved.

Meanwhile, although the number of illuminating beams that are divided can be improved by using the anisotropic diffusion plate 229, there is a possibility where speckle noise that has been generated, although reduced, may be recognized as a fixed pattern when the respective incident angles of light rays that are incident on the respective cells of the fly-eye lens array 217 remain constant. Thus, in the head up display 100 according to the first embodiment, the recognition of such a fixed pattern can be prevented by vibrating the anisotropic diffusion plate 229.

As shown in FIG. 4, the vibration motor 234 is attached to the anisotropic diffusion plate 229 so as to minutely vibrate the anisotropic diffusion plate 229 at 60 Hz to 200

Figure 10:
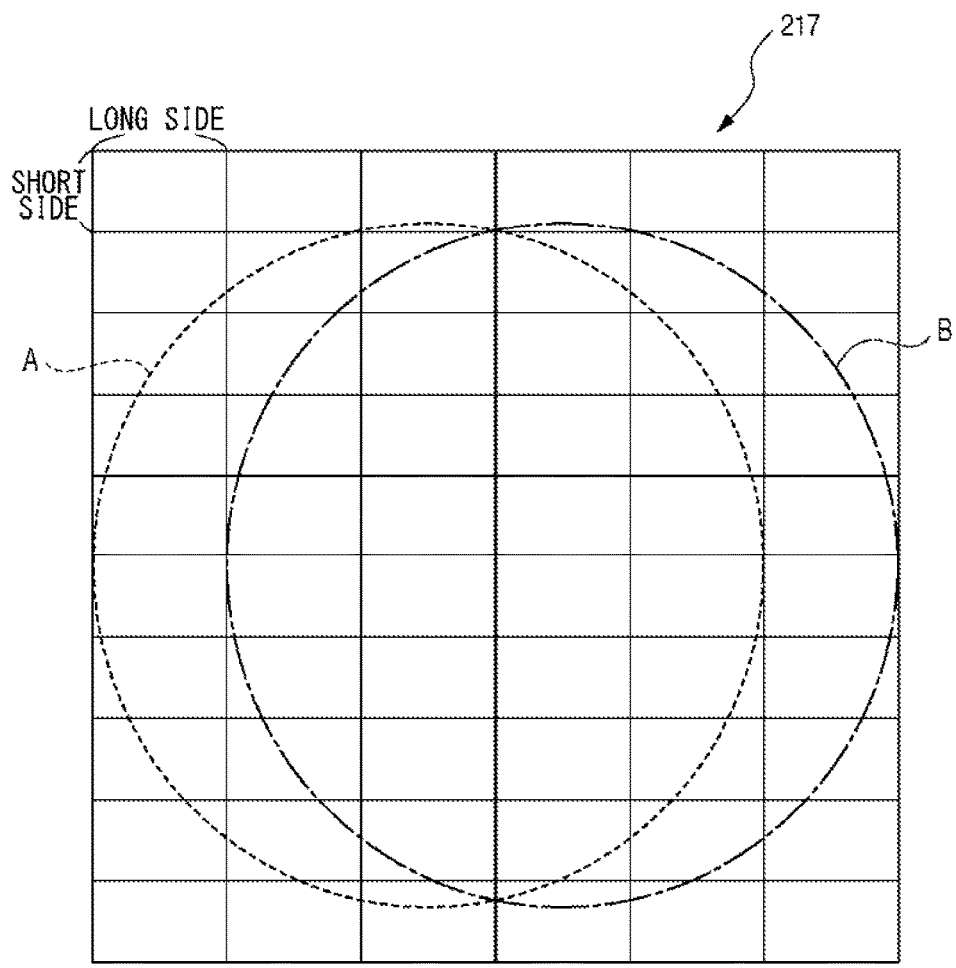
FIG. 10 is a diagram showing an irradiation range of a fly-eye lens when an anisotropic diffusion plate that vibrates minutely is used.

Hz. The direction of the minute vibration is parallel to the direction of the long side of the rectangular cells of the fly-eye lens array 217 described above, and the amplitude of the vibration is 200 µm, which is almost the same as the size of the long side of the cells. FIG. 10 shows the range A of light radiated onto the fly-eye lens array 217 at one edge of the amplitude of the minute vibration and the range B of light at the other edge of the amplitude.

Since cells onto which light is radiated are changed by the minute vibration of the anisotropic diffusion plate 229 as described, generation of speckle noise produced by light that is incident on a specific cell over a predetermined period of time in a fixed manner can be prevented. Further, by allowing a different speckle to be sequentially generated in accordance with the vibration, an observer can no longer recognize specific speckle noise, and speckle noise can be reduced as a result.

Figure 11:
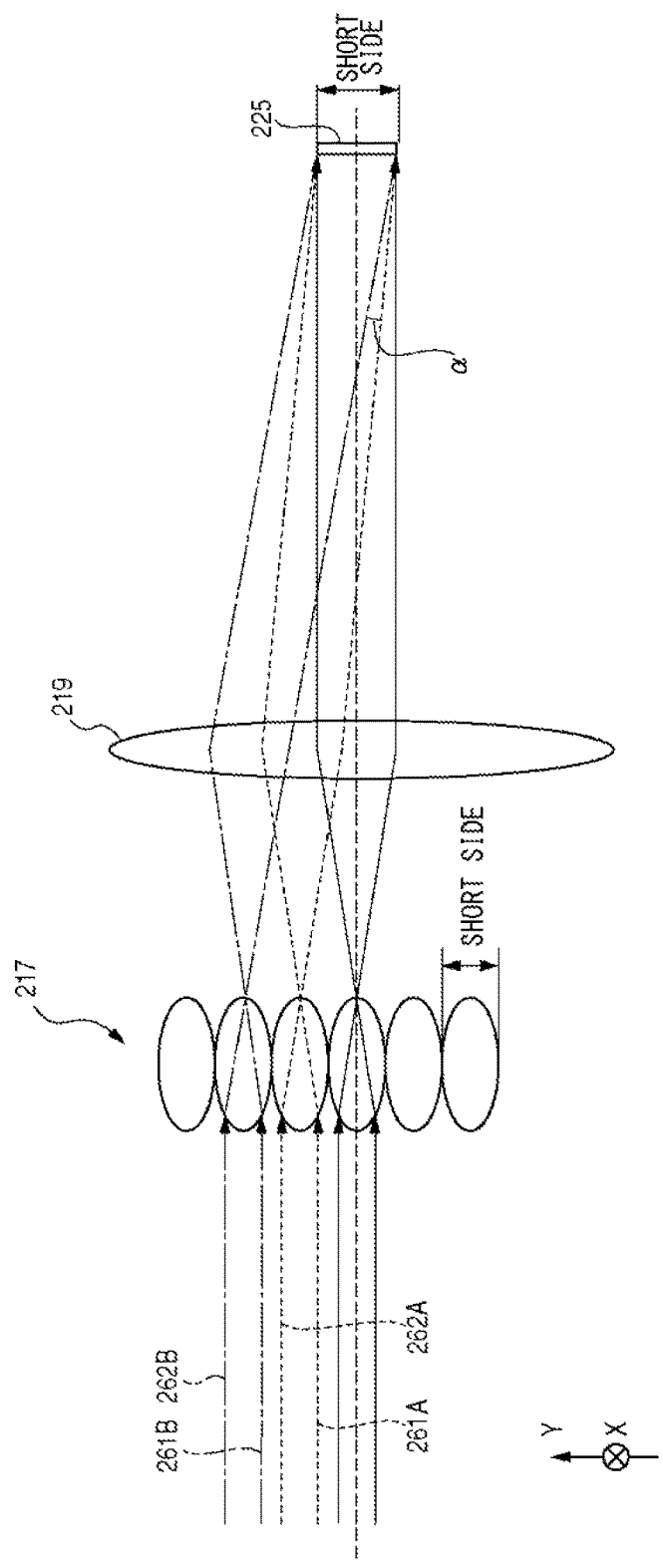
FIG. 11 is a diagram schematically expressing the progress of light transmitted through a fly-eye lens array and becoming incident on an image display element when vibrated in the extending direction of a short side of a rectangular cell.
Figure 12:
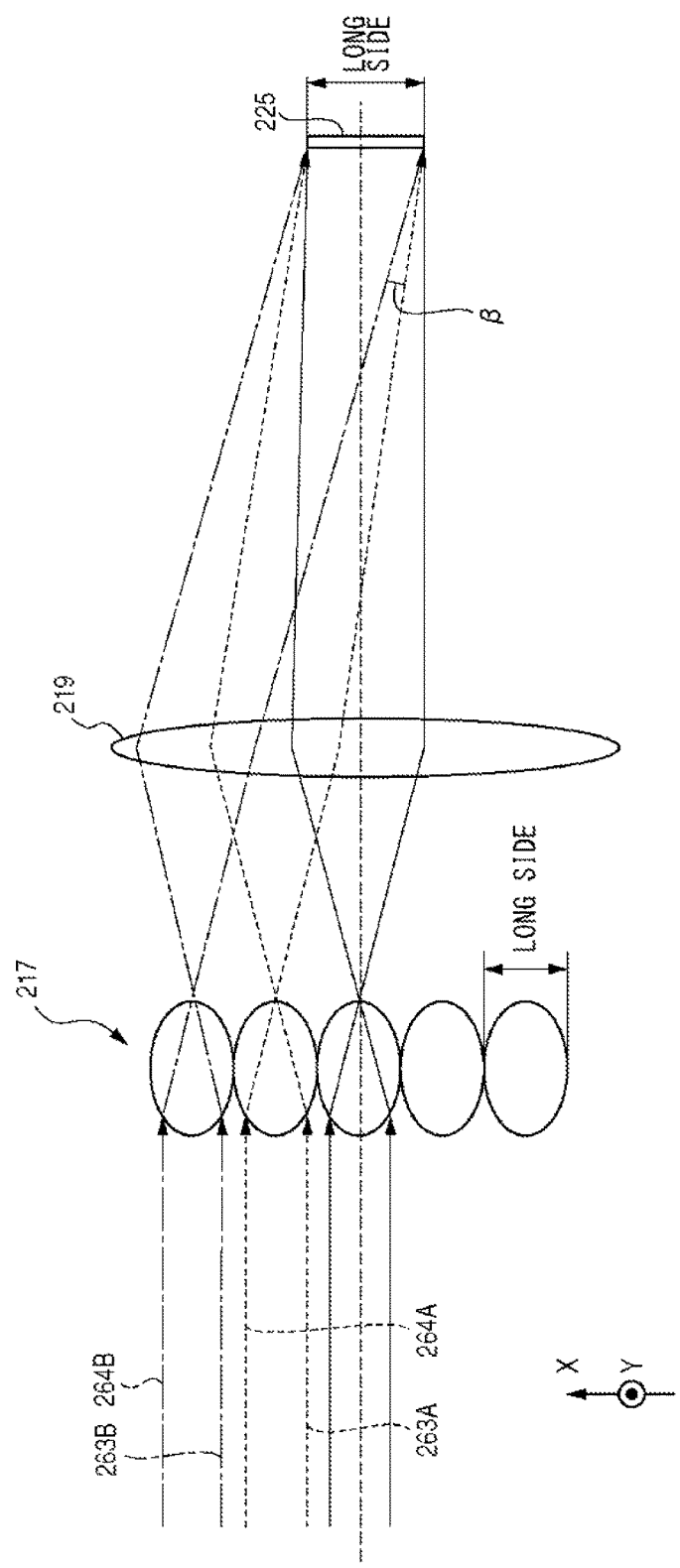
FIG. 12 is a diagram schematically expressing the progress of light transmitted through a fly-eye lens array and becoming incident on an image display element when vibrated in the extending direction of a long side of a rectangular cell.

An explanation is now given regarding the use of the direction of the long side of a cell having sides of different lengths as the direction for the vibration. FIG. 11 is a diagram, which is viewed from the side of a short side of a rectangular cell, schematically expressing the progress of light transmitted through the fly-eye lens array 217 and becoming incident on the image display element 225. FIG. 11 shows a case where the anisotropic diffusion plate 229 is vibrated in a Y direction in which a short side of a rectangular cell extends. FIG. 12 is a diagram, which is viewed from the side of a long side of a rectangular cell, schematically expressing the progress of light transmitted through the fly-eye lens array 217 and becoming incident on the image display element 225. FIG. 12 shows a case where the anisotropic diffusion plate 229 is vibrated in an X direction in which a long side of the rectangular cell extends. For an easier understanding of the explanation, a field lens 221 and a polarization beam splitter 223 are omitted in FIGS. 11 and 12.

Light rays 261A and 262A shown in FIG. 11 represent light rays occurring when the anisotropic diffusion plate 229 is located at one edge of the amplitude of the vibration in a Y direction, which is the direction of a short side of a cell, and light rays 261B and 262B represent light rays occurring when the anisotropic diffusion plate 229 is located at the other edge of the amplitude of the vibration in the Y direction. The light rays 261A and 261B are the same light ray 261 before becoming incident on the anisotropic diffusion plate 229, and the light rays 262A and 262B are the same light ray 262 in the same manner.

In a telecentric optical system, even when an incident optical path is changed (shifted) in a single cell, the angle of light that becomes incident on the image display element 225 does not change. Therefore, for example in FIG. 11, the light rays 261A and 262A become incident on the image display element 225 at the same angle. The same relationship applies to other optical paths shown by a solid line or a dashed line in FIGS. 11 and 12. On the other hand, in the telecentric optical system, when an incident optical path is changed (shifted) across a plurality of cells, the incident angle to the image display element 225 changes. In FIG. 11, for example, when the light ray 261A is changed (shifted) to the optical path of the light ray 261B based on the vibration of the anisotropic diffusion plate 229, the incident angle thereof to the image display element 225 changes by the amount of an angle α.

As described, by vibrating the anisotropic diffusion plate 229 at an amplitude of at least one cell (the length of one side of a cell), the light ray 261 repeats a change from being at the position of the light ray 261A to the position of the light ray 261B, and the light ray 262 repeats a change from being at the position of the light ray 262A to the position of the light ray 262B. Then, the incident angle of light that is incident on the image display element 225 changes by the amount of the angle α for every predetermined period of time based on the vibration of the anisotropic diffusion plate 229.

Meanwhile, similarly in light rays 263A and 264A shown in FIG. 12, the light rays 263A and 264A repeat a displacement from the respective positions of light rays 263B and 264B, respectively, in accordance with the vibration of the anisotropic diffusion plate 229 with an amplitude of one cell in an X direction, which is the direction of a long side thereof. The incident angle of light that is incident on the image display element 225 changes by the amount of the angle β, which is larger than the angle α, for every predetermined period of time based on the vibration of the anisotropic diffusion plate 229.

As described above, in order to change the incident angle of light that is incident on the image display element 225, it is effective to change (shift) the optical path of the incident light by at least the amount of the length of one predetermined side of the cells constituting the fly-eye lens array 217. By changing (shifting) the optical path by the amount of the length of a long side of the cells, the incident angle can be changed more largely than a case where the optical path is changed (shifted) by the amount of the length of a short side thereof.

In other words, the fly-eye lens array 217 is formed by arrangement of a plurality of cells having a first width and having a second width, which is larger than the first width, in a direction perpendicular to the first width, and it is effective to vibrate the anisotropic diffusion plate 229 at an amplitude that corresponds to the length of the second width in the direction perpendicular to the first width in the vibration motor 234, which is a vibration unit.

As described above, in the head up display 100 according to the first embodiment, the incident angle of light that is incident on the image display element 225 can be efficiently changed by the vibration of the anisotropic diffusion plate 229 at an amplitude corresponding to the amount of the length of the long side of the cells. This ensures a wide angle distribution of light that is incident on the image display element 225. Thus, limiting resolution can be ensured, and an image having high brightness uniformity can be displayed. Further, the recognition of fixed speckle noise can be prevented, and a high-quality image can thus be displayed.

Second Embodiment

Figure 13:
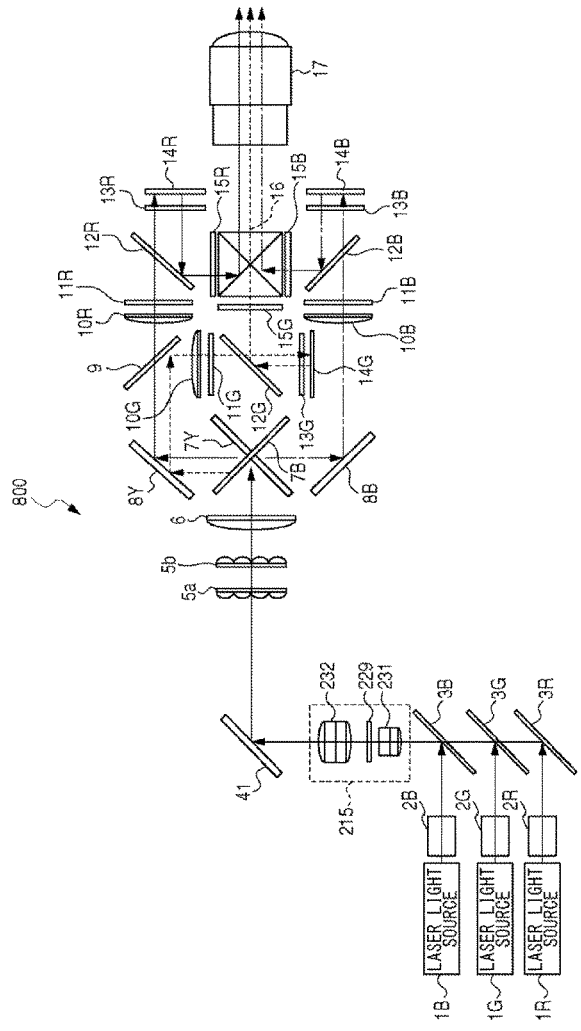
FIG. 13 is a diagram showing an optical system that is arranged inside a projector, which is an image display device according to a second embodiment.
Figure 15:
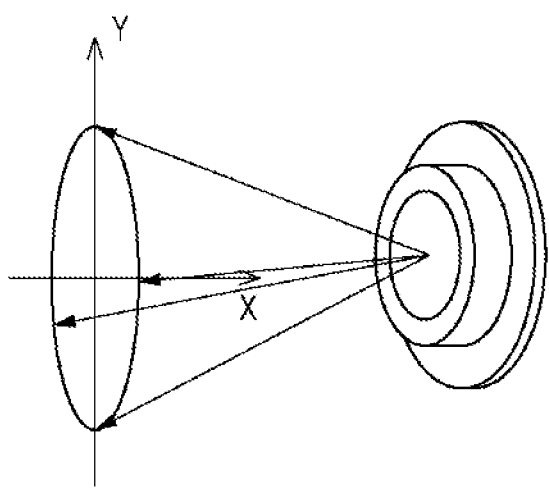
FIG. 15 schematically shows elliptically-shaped distribution of a beam of the emitted light from the laser diode.

FIG. 13 shows an optical system 800 arranged inside a projector, which is an image display device according to a second embodiment. As shown in this figure, laser light sources 1R, 1G, and 1B consisting of laser diodes emit red light, green light, and blue light, respectively. Beam expanders 2R, 2G, and 2B constituted of lenses change the red light, the green light, and the blue light, which are respectively incident, into collimated light.

A dichroic mirror 3R reflects the red light emitted from the beam expander 2R, bending the optical path thereof by 90 degrees. A dichroic mirror 3G reflects the green light emitted from the beam expander 2G, bending the optical path thereof by 90 degrees. The dichroic mirror 3G also combines the red light with the green light and emits resulting combined light. A dichroic mirror 3B reflects the blue light emitted from the beam expander 2B, bending the optical path thereof by 90 degrees. The dichroic mirror 3B also combines the combined light of the red light and the green light with the blue light and emits resulting combined light. This allows for the emission of combined light of the three primary colors, in which the red light, the green light, and the blue light are combined, from the dichroic mirror 3B.

The combined light of the three primary colors becomes incident on an afocal optical system 215. The configuration and the function of the afocal optical system 215 are the same as those shown in FIG. 4 and the explanation thereof. Thus, the explanation is omitted. The combined light of the three primary colors with a beam expanded by the afocal optical system 215 becomes incident on a fly-eye lens array 5a via a mirror 41.

A fly-eye lens array 5b is arranged on the light emission side of the fly-eye lens array 5a. The fly-eye lens arrays 5a and 5b have a shape where a plurality of rectangular lens cells are arranged in an x direction and a y direction. The combined light of the three primary colors incident on each of the cells of the fly-eye lens array 5a becomes incident on each of the cells of the fly-eye lens array 5b. The combined light of the three primary colors emitted from each of the cells of the fly-eye lens array 5b is collected by a condenser lens 6 and becomes incident on dichroic mirrors 7Y and 7B.

The dichroic mirror 7Y separates the combined light of the red light and the green light from the combined light of the three primary colors, and the dichroic mirror 7B separates the blue light from the combined light of the three primary colors. FIG. 13 shows, in optical paths occurring at the dichroic mirrors 7Y and 7B and thereafter, the red light, the green light, and the blue light by a solid line, a dashed line, and a dashed-dotted line, respectively. A mirror 8Y reflects the combined light, bending the optical path thereof by 90 degrees. A mirror 8B reflects the blue light, bending the optical path thereof by 90 degrees. The combined light becomes incident on a dichroic mirror 9, and the blue light becomes incident on a field lens 10B.

The dichroic mirror 9 transmits the red light and reflects the green light, bending the optical path of the green light by 90 degrees. The red light transmitted through the dichroic mirror 9 becomes incident on a field lens 10R. The green light whose optical path has been bent by the dichroic mirror 9 becomes incident on a field lens 10G. The field lenses 10R, 10G, and 10B are generically referred to as field lenses 10. The red light, the green light, and the blue light emitted from the field lenses 10 become incident on wire-grid type polarization beam splitters 12R, 12G, and 12B via polarization plates 11R, 11G, and 11B serving as polarizers, respectively.

The polarization beam splitters 12R, 12G, and 12B allow the passage of either one of respective P-polarized light components and respective S-polarized light components of the red light, the green light, and the blue light, respectively. For example, the polarization beam splitters 12R, 12G, and 12B allow the passage of only the respective P-polarized light components. The respective P-polarized light components of the red light, the green light, and the blue light are transmitted through compensators 13R, 13G, and 13B, which compensate for angular characteristics by adjusting respective polarization directions, and become incident on reflection type liquid crystal elements (modulation elements) 14R, 14G, and 14B, respectively. The reflection type liquid crystal elements 14R, 14G, and 14B are generically referred to as reflection type liquid crystal elements 14. The red light, the green light, and the blue light incident on the respective reflection type liquid crystal elements 14 are modulated in accordance with respective components of red, green, and blue of a video signal and converted into S-polarized light components, respectively.

The respective S-polarized light components of the red light, the green light, and the blue light reflected by the respective reflection type liquid crystal elements 14 are again transmitted through the compensators 13R, 13G, and 13B and become incident on the polarization beam splitters 12R, 12G, and 12B, respectively. The polarization beam splitters 12R, 12G, and 12B reflect the respective S-polarized light components of the red light, the green light, and the blue light, bending the respective optical paths by 90 degrees, respectively. The respective S-polarized light components of the red light, the green light, and the blue light become incident on a cross dichroic prism 16 via respective polarization plates 15R, 15G, and 15B serving as polarizers, respectively. The cross dichroic prism 16 combines the red light, the green light, and the blue light, and a projection lens 17 projects combined light on a screen (not shown).

Even when the configuration of an optical system of a projector such as the one described above is employed, as in the case of the first embodiment, light having higher brightness uniformity can be achieved since the anisotropic diffusion plate 229 is used, and an image having brightness uniformity overall can be displayed.

Also, since the fly-eye lens arrays 5a and 5b are irradiated using the anisotropic diffusion plate 229, the number of divided illuminating beams can be increased, and speckle noise caused by collimated light emitted from the laser diode can be reduced by the segmentalization and dispersion of the distribution of light angles, thus achieving light having higher brightness uniformity.

Since cells onto which light is radiated are changed by minute vibration of the anisotropic diffusion plate 229, speckle noise is not generated in a fixed pattern, and speckle noise that can be recognized can thus be reduced. Therefore, light having higher brightness uniformity can be achieved, and a high-quality image can thus be displayed.

Shown above is a case where a head up display and a projector are used as examples of a projection display device. However, the configuration of an afocal optical system according to the present embodiment can be used for other projection type display devices.

What is claimed is:
1. An image display device comprising:
   a light source that emits a beam having a spreading angle in a first direction and a spreading angle in a second direction, which is smaller than the spreading angle in the first direction, in a direction perpendicular to the first direction;
   an afocal optical system member that has a first lens, a second lens, and a focal point located between the first and second lens, wherein the first lens focuses the beam emitted by the light source into the focal point and the second lens changes the beam coming from the focal point into a parallel beam;
   an anisotropic diffusion plate that is arranged at a position corresponding to the focal point and that widens at least the spreading angle in the second direction;
   a vibration unit that vibrates the anisotropic diffusion plate in a predetermined direction;
   a fly-eye lens array on which the parallel beam emitted from the afocal optical system member becomes incident;
   an image display element that modulates the beam that has passed through the fly-eye lens array into image display light; and
   a projection lens that projects the image display light.

2. The image display device according to claim 1,
wherein the fly-eye lens array has a plurality of cells that are arranged, and
wherein the vibration unit vibrates the anisotropic diffusion plate at an amplitude, based on a width of the cells in a direction that is parallel to the predetermined direction.

3. The image display device according to claim 2,
wherein each cell of the fly-eye lens is rectangular and has a long side and a short side, and
wherein the predetermined direction is parallel to the long side of each cell.

4. The image display device according to claim 3,
wherein the vibration unit vibrates the anisotropic diffusion plate at an amplitude which substantially equals a length of the long side of each cell.

5. The image display device according to claim 1,
wherein the predetermined direction is parallel to the second direction.

* * * * *